(12) United States Patent
Lu et al.

(10) Patent No.: US 10,546,430 B1
(45) Date of Patent: Jan. 28, 2020

(54) IMAGE PLANE ADJUSTMENT IN A NEAR-EYE DISPLAY

(71) Applicant: Facebook Technologies, LLC, Menlo Park, CA (US)

(72) Inventors: Lu Lu, Seattle, WA (US); Ji Luo, Redmond, WA (US); Nicholas Daniel Trail, Bothell, WA (US); Kevin James MacKenzie, Sammamish, WA (US); Pasi Saarikko, Kirkland, WA (US); Andrew John Ouderkirk, Redmond, WA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 25 days.

(21) Appl. No.: 15/901,288

(22) Filed: Feb. 21, 2018

Related U.S. Application Data

(60) Provisional application No. 62/551,504, filed on Aug. 29, 2017.

(51) Int. Cl.
*G06T 15/20* (2011.01)
*G06T 19/00* (2011.01)
*G06F 3/01* (2006.01)
*G02B 27/01* (2006.01)

(52) U.S. Cl.
CPC ........ *G06T 19/006* (2013.01); *G02B 27/0172* (2013.01); *G06F 3/013* (2013.01); *G02B 2027/011* (2013.01); *G02B 2027/0178* (2013.01)

(58) Field of Classification Search
CPC ........ G06T 15/20; G06T 3/1423; G06T 3/00; G02B 2027/0185
USPC ........................................ 345/633
See application file for complete search history.

(56) References Cited

U.S. PATENT DOCUMENTS

| 10,248,001 B1* | 4/2019 | Lu ............................. G02F 1/29 |
| 2016/0260258 A1* | 9/2016 | Lo ............................. G06T 7/00 |
| 2017/0206713 A1* | 7/2017 | Lo ............................. G06T 7/00 |
| 2018/0239145 A1* | 8/2018 | Lanman ............. G02B 27/0172 |

\* cited by examiner

*Primary Examiner* — Thomas J Lett
(74) *Attorney, Agent, or Firm* — Fenwick & West LLP

(57) ABSTRACT

A near-eye display (NED) has an orientation detection device and a display block. The orientation detection device collects orientation data that describe an orientation of the NED. The display block has a display assembly, a focusing assembly, and a controller. The controller determines an orientation vector of the NED based in part on the orientation data and computes an angular difference between the orientation vector of the NED and a gravity vector. After comparing the angular difference to a threshold value, the controller generates multifocal instructions that adjusts the optical element to display an augmented scene at the selected image plane corresponding to the multifocal instructions.

20 Claims, 7 Drawing Sheets

IMAGE PLANE ADJUSTMENT IN A NEAR-EYE DISPLAY

CROSS REFERENCE TO RELATED APPLICATIONS

This application claims the benefit of U.S. Provisional Application No. 62/551,504, filed on Aug. 29, 2017, which is incorporated by reference in its entirety.

BACKGROUND

This disclosure relates generally to a near-eye display (NED), and specifically relates to adjusting a location of an image plane based in part on an orientation of the NED.

A near-eye display (NED) can be used to simulate virtual environments. However, conventional NEDs only have one fixed image plane at either 2 meters or 3 meters away from the user's eye, which cannot accurately portray all scenarios in the virtual environments. The fixed image plane can be appropriate for scenarios in which the user is viewing an object at least 2 meters or 3 meters away. However, in other scenarios such as reading a book, which typically occur at a distance of less than 2 meters from the user's eye, the user may experience ocular stress due to the focusing point of the user's eyes and the image plane not corresponding to the same point. The user may also notice that the augmented scene is less realistic because it is projected on an image plane that is farther from what the user anticipates based on the scenario being displayed.

SUMMARY

A near-eye display (NED) with multiple image planes is presented herein. The NED may be a part of an artificial reality system. The NED includes an orientation detection device and a display block. In some embodiments, the NED may include an orientation detection device which provides orientation data that describes an orientation of the NED. The orientation may be measured relative to a gravity vector, and may be a factor in, e.g., determining if a user is looking at something relatively close (e.g., when reading a book) or looking at something at a distance (e.g., across a room). The display block combines light from a local area with image light to form an augmented scene, and provides the augmented scene to an eyebox corresponding a location of a user's eye. The display block includes a display assembly, a focusing assembly, and a controller. The display assembly is configured to emit the image light that includes a virtual object. In some embodiments, the display assembly may be a waveguide display. In other embodiments, the display assembly may be an optical combiner display. The focusing assembly has a plurality of optical powers that each correspond to different image planes. The focusing assembly adjusts its optical power in accordance with multifocal instructions. The controller is configured to select an optical power, of a plurality of optical powers of the focusing assembly, based in part on the orientation data, the selected optical power associated with an image plane. The controller generates the multifocal instructions based in part on the selected optical power. And the augmented scene provided by the display block to the user includes the virtual object at the image plane.

In some embodiments, the NED collects orientation data describing an orientation of the NED. The NED selects, based in part on the orientation data, an optical power from a plurality of optical powers of a focusing assembly. And the plurality of optical powers are each associated with a different image plane. The NED adjusts an optical power of the focusing assembly to the selected optical power.

In some embodiments, the NED may include an eye tracking system configured to determine a gaze area of a user. The controller may use the determined gaze area in combination with the IMU data to select an optical power of the plurality of optical powers of the focusing assembly.

Figure 1A:
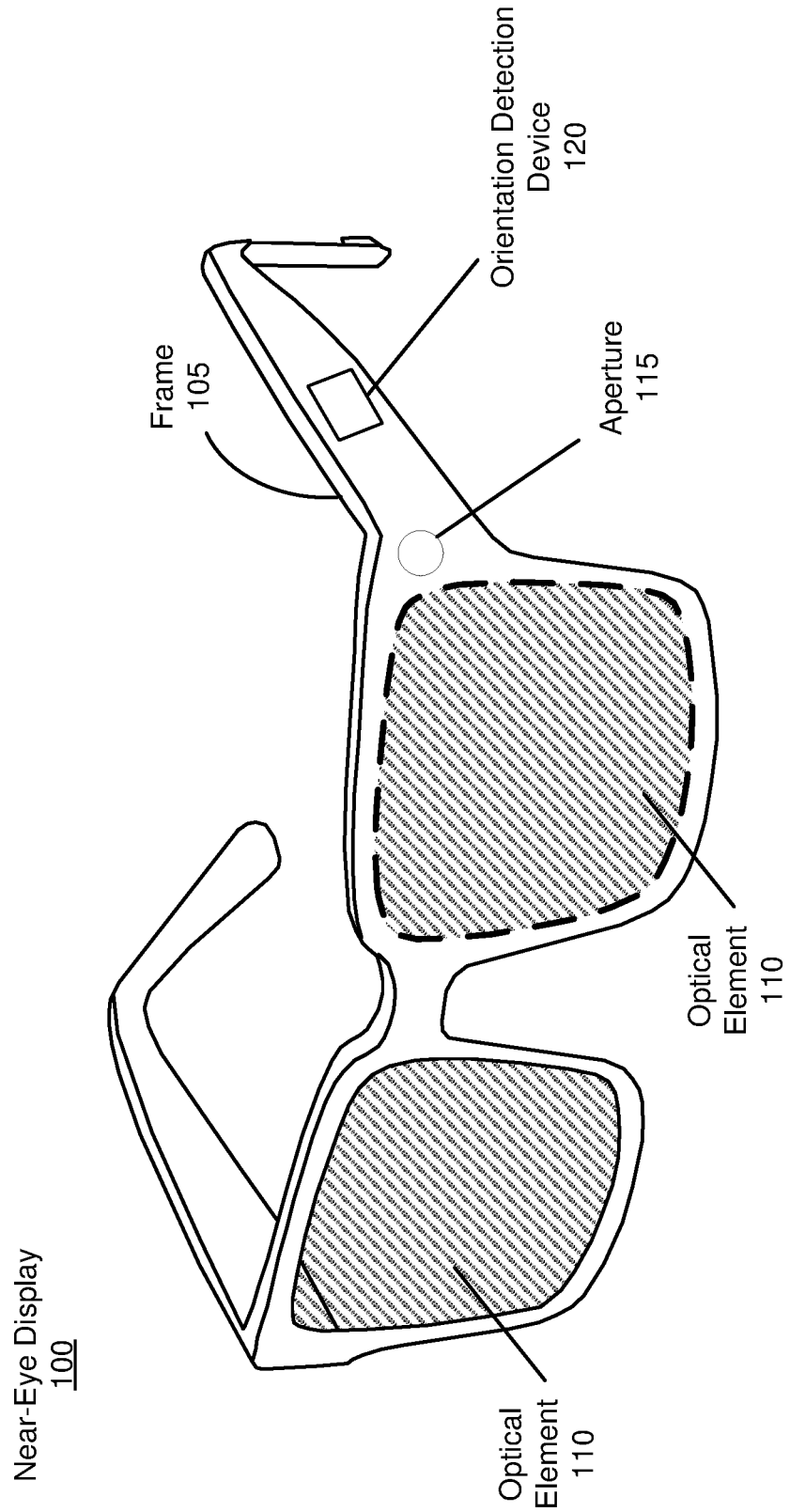
FIG. 1A is a diagram of a near-eye display (NED), in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A near-eye display (NED) comprises an optical element with multiple optical powers. Each optical power corresponds to an image plane that is located at a distinct distance from the user's eye. Depending on the orientation of the NED, the movement of the user's eye, or other data indicative of the NED usage, a controller selects an optical power and generates multifocal instructions based in part on the selected optical power. The selected optical power is applied at the optical element such that an augmented scene is displayed at the image plane corresponding to the optical power.

In some embodiments, an orientation detection device is an inertial measurement unit that collects data corresponding to the orientation of the NED. The controller uses the data to determine an orientation vector of the NED and compare the orientation vector to a gravity vector. The controller computes an angular difference between the orientation vector of the NED and the gravity vector and compares it to a threshold value. Depending on the results of the comparison to the threshold value, the controller generates multifocal instructions that adjusts the optical element to display an augmented scene at the selected image plane.

In some embodiments, the NED may also comprise an eye tracking system that determines the position of a user's eye or the gaze area of a user's eye. The controller may use data collected by the eye tracking system in conjunction with an orientation detection device to select an optical power and generate multifocal instructions corresponding to the optical power.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of a near-eye display (NED) 100, in accordance with one or more embodiments. The NED 100 presents media to a user. Examples of media presented by the NED 100 include one or more images, text, video, audio, or some combination thereof. In some embodiments, audio is presented via an external device (e.g., speakers and/or headphones) that receives audio information from the NED 100, a console (not shown), or both, and presents audio data based on the audio information. The NED 100 can be configured to operate as an artificial reality NED. For example, in some embodiments, the NED 100 may augment views of a physical, real-world environment with computer-generated elements (e.g., images, video, sound, etc.).

The NED 100 shown in FIG. 1A includes a frame 105, one or more optical elements 110, an orientation detection device 120, and optically includes an aperture 115 (e.g., for use with a depth camera assembly). In some embodiments, the frame 105 may represent a frame of eye-wear glasses. The optical element 110 may be configured for users to see content presented by the NED 100. In some embodiments, the optical element 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical element 110 may include one or more additional layers or coatings, such as protective coatings, or coatings for providing any of the aforementioned lens functions. In some embodiments, the optical element 110 may include a combination of one or more waveguide display assemblies, one or more lenses, and/or more other layers or coatings.

The orientation detection device 120 is a data collecting electronic module that detects an orientation of the NED 100. In some embodiments, the orientation detection device 120 detects an angular velocity and linear acceleration in up to six degrees of freedom (i.e., x, y, z, yaw, pitch, and roll). The orientation detection device 120 may include one or more inertial measurement units (IMUs), one or more accelerometers, one or more gyroscopes, one or more magnetometers, some other sensor that detect movement, of the NED 100, or some combination thereof. In some embodiments, orientation detection device 120 determines an orientation from the collected data. In other embodiments, the orientation detection device 120 provides some, or all, of the data collected from the sensors to some other entity (e.g., a controller of a display block) to determine an orientation of the NED 100. For the purposes of illustration, FIG. 1A shows the orientation detection device 120 in (or on) one of the arms on the frame 105, but in other embodiments, the orientation detection device 120 can be located elsewhere in (or on) the frame 105.

In some embodiments, the NED 100 also includes at least one aperture 115 for a depth camera assembly (DCA). In some embodiments, a DCA emits light (e.g., structured light) through the aperture 115. The DCA captures images of the emitted light that is reflected from a local area through the aperture 115. In some embodiments, there are multiple apertures, e.g., one that the DCA emits light through and a second aperture that the DCA captures images of the local area through.

Figure 1B:
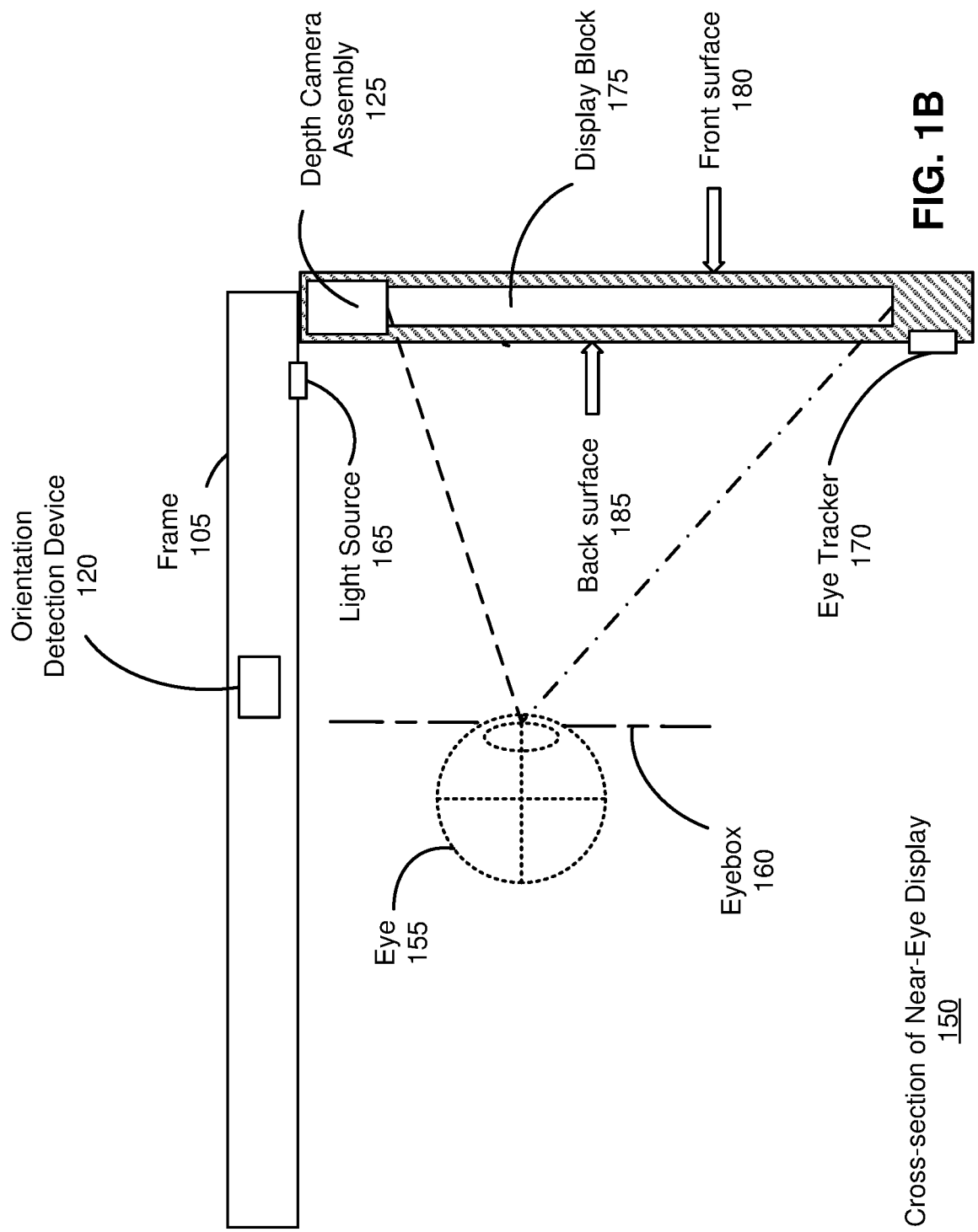
FIG. 1B is a cross-section of the NED in FIG. 1A, in accordance with one or more embodiments.

FIG. 1B is a cross-section 150 of the NED 100 illustrated in FIG. 1A, in accordance with an embodiment. The display block 175 is housed in the frame 105, which is shaded in the section surrounding the display block 175. The display block 175 has a back surface 185, which faces inward relative to the user, and a front surface 180 which faces outward relative to a user. A user's eye 155 is shown, with dotted lines leading out of the pupil of the eye 155 and extending outward to show the eye's field of vision. An eyebox 160 shows a location where the eye 155 is positioned if the user wears the NED 100.

In some embodiments, the NED 100 includes an eye tracking system. The eye tracking system includes a light source 165 and an eye tracker 170. For the purposes of illustration, FIG. 1B shows the cross-section 150 associated with a single eye 155, a single display block 175, and a single eye tracker 170, but in some embodiments, another display block 175 and another eye tracker 170 (including another light source 165) can be included for another eye 155. Moreover, in some embodiments, the NED 100 may include additional light sources and/or eye tracking systems for one or both eyes.

The eye tracking system determines eye tracking information for the user's eye 155. The determined eye tracking information may comprise information about a position of the user's eye 155 in an eyebox 160, e.g., information about an angle of an eye-gaze. An eyebox 160 represents a three-dimensional volume at an output of a display in which the user's eye is located to receive image light.

As mentioned above, the eye tracking system includes one or more light sources such as the light source 165. The light source 165 is configured to emit light at a particular wavelength or within a particular band of wavelengths. For example, light source 165 may be configured to emit light in the infrared band (~750 nm to 1700 nm), in a visible band (~380 nm to 750 nm), in the ultraviolet band (300 nm to 380 nm), or some other portion of the electromagnetic spectrum. The light source 165 may be configured to emit light in a sub-division of a band, e.g., in the near-infrared band, the short-wavelength infrared band, or a particular color of visible light, or at a particular wavelength. The light source 165 may be, for example, laser diodes (e.g., edge emitters), inorganic or organic LEDs, vertical-cavity surface-emitting lasers (VCSELs), or some other source. In some embodiments, one or more of the light sources may emit structured light. Structured light is light that can be used to determine depth information by allowing the correspondence between the light source, angular position on the object, and the camera position. Structured light may include, e.g., a pattern of dots, a pattern of lines, a patterns of sinusoids, some other light that can be used to determine depth information, or some combination thereof.

A single light source 165 or multiple light sources may be included. The light source(s) may be positioned outside of the user's typical line of sight. For example, the light source(s) may be embedded in the frame 105, as shown in FIG. 1B. Using multiple light sources may provide more illumination than a single light source. Further, using multiple light sources may provide better coverage of the eyebox 160. Using multiple light sources may help ensure that the eye tracker 170 can receive a good view of the eye under a range of conditions, e.g., for users with different facial geometries, or throughout a range of potential eye directions. In some embodiments, additional light sources may be included elsewhere on the frame 105 and/or the light source 165 may be located elsewhere on the frame 105.

The eye tracker 170 receives light that is emitted from the light source 165 and reflected off of the eye 155. The eye tracker 170 includes one or more cameras that capture images of the received light. The eye tracker 170 or an external controller analyze the captured images to determine eye position. The determined eye position may be used to determine, e.g., a point of gaze of the user, track motion of the eye 155 of the user (i.e., eye movement), etc.

As shown in FIG. 1B, the eye tracker 170 is embedded into the frame 105. In some embodiments, the eye tracker 170 is hidden from view of the eye 155. In some embodiments, the eye 155 may be able to view at least part of the eye tracker 170, but by locating the eye tracker 170 in or near the frame 105, the eye tracker 170 does not obstruct the vision of the user, and may be less distracting than if the eye tracker 170 were closer to the optical axis.

As shown in FIG. 1B, the eye tracker 170 can be embedded in an upper portion of the frame 105. However, in some embodiments, the eye tracker 170 may be located elsewhere on the frame 105. While only one eye tracker 170 is shown in FIG. 1B, the NED 100 may include multiple eye trackers 170 per eye 155. For example, different eye trackers 170 may be embedded in different parts of the frame 105. Using multiple eye trackers 170 per eye 155 may increase the accuracy of the eye tracking, and provides redundancy in case an eye tracker 170 or a component of the eye tracker 170 breaks, becomes dirty, is blocked, or otherwise has diminished functionality.

In some embodiments, the NED 100 also includes the DCA 125. The DCA 125 determines depth information of one or more objects in a local area surrounding some or all of the NED 100. The DCA 125 includes an imaging device and a light generator. The light generator is configured to illuminate the local area with light (e.g., structured light, time of light pulse, etc.). The light generator may emit light through an aperture (e.g., aperture 115). The light generator may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator can emit one or more light beams.

The imaging device captures one or more images of one or more objects in the local area illuminated with the light from the light generator. The imaging device may be directed towards the local area through an aperture (e.g., aperture 115 or some other aperture). The DCA 125 determines depth information for the one or more objects based on the captured portion of the reflected light. In some embodiments, the DCA 125 provides the determined depth information to a console (not shown in FIG. 1A) and/or an appropriate module of the NED 100 (e.g., a display block). The console and/or the NED 100 may utilize the depth information to, e.g., identify a location of an image plane for presentation of content.

Figure 2:
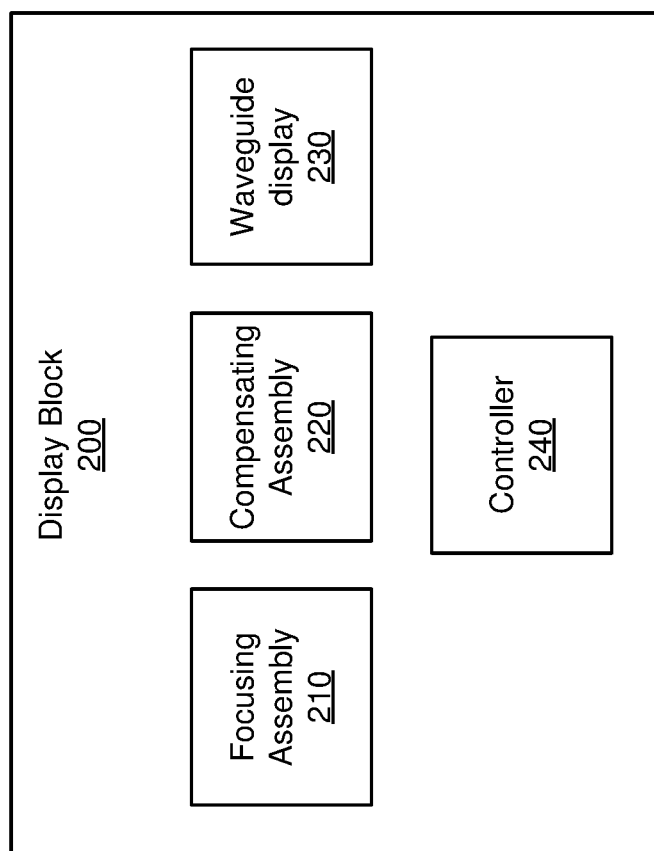
FIG. 2 is a block diagram of a display block, in accordance with one or more embodiments.

FIG. 2 is a block diagram of display block 200 in accordance with an embodiment. The display block 200 comprises a focusing assembly 210, a compensating assembly 220, a waveguide display 230, and a controller 240. In other embodiments (not shown), the display block may comprise an optical combiner display instead of a waveguide display. The optical combiner display may comprise a variety of light combiners (e.g., polarized beam combiner, simple half-tone mirrors, etc.) and an electronic display. For simplicity, only the embodiment wherein the display block comprises a waveguide display is described in further discussion of the display block.

The display block 200 is configured to combine light from a local area with image light to form an augmented scene, and provide the augmented scene to an eyebox (e.g., the eyebox 160). The display block 175 is an embodiment of the display block 200. In other embodiments, the display block 200 comprises additional or fewer modules than those described herein. Similarly, the functions can be distributed among the modules and/or different entities in a different manner than is described here.

The focusing assembly 210 is configured to adjust its optical powers in accordance with multifocal instructions from the controller 240. In some embodiments, the focusing assembly 210 includes one or more optical elements that can adjust optical power. In cases where there are a plurality of optical elements, the optical elements are in optical series with each other. An optical element may be, e.g., a geometric phase lens, a Pancharatnam Berry Phase (PBP) liquid crystal lens, a liquid crystal (LC) lens, a hybrid lens, a liquid-membrane lens, a polarizer, a polarization rotor, or some combination thereof. An example stack of optical elements is one circular polarizer, a first PBP lens with two possible optical powers, one polarization rotor, and a second PBP lens with two possible optical powers. The stack of optical elements has at least two possible combinations of optical powers. A first combination of optical powers is a sum of the first optical powers of the two PBP lenses in the example stack. A second combination of optical powers is a sum of the second optical powers of the two PBP lenses in the example stack. The controller 240 can select an optical power and generate multifocal instructions to adjust one or more optical elements to operate in the selected optical power. The optical power of the focusing assembly 210 controls the location of an image plane. Embodiments of the focusing assembly 210 are further discussed in, e.g., U.S. patent application Ser. No. 15/484,422, that is herein incorporated by reference in its entirety.

The compensating assembly 220 is configured to adjust its optical powers in accordance with multifocal instructions from the controller 240. The compensating assembly 220 has a plurality of compensating optical powers that are complementary to the plurality of focusing optical powers of the focusing assembly 210. The display block 200 provides a combination of real life image and virtual object to deliver an augmented scene to the user's eye. The light from a local area (i.e., real life image) is combined with image light (i.e., virtual object) to provide the augmented scene to the user's eye. The light from the local area enters through the front surface 180 and travels through the compensating assembly 220, the waveguide display 230, and the focusing assembly 210 and into the user's eye. The compensating assembly 220 imparts compensating optical power to light received from the local area prior to transmitting the light to the focusing assembly 210. The compensating optical power acts to offset the optical power that is imparted by the focusing assembly 210. Accordingly, the compensating assembly 220 can impart optical power that is matched (same magnitude) and opposite (opposite sign) to the optical power imparted by the focusing assembly 210. For example, the controller 240 generates multifocal instructions that cause the focusing assembly 210 to impart a positive two diopters of optical power, and cause the compensating assembly 220 to impart a negative two diopters of optical power, such that the net effect of the focusing assembly 210 and compensating assembly 220 is zero diopters.

The compensating assembly 220, like the focusing assembly 210, includes one or more optical elements that can adjust optical power. In cases where there are a plurality of optical elements, the optical elements are in optical series with each other such that the optical power of the compensating assembly 220 is complementary to the optical power of the focusing assembly 210. An optical element may be, e.g., a geometric phase lens, a PBP liquid crystal lens, a LC lens, a hybrid lens, a liquid-membrane lens, polarizer, polarization rotor or some combination thereof. Embodiments of compensating assembly 220 are further discussed in, e.g., U.S. patent application Ser. No. 15/484,422, that is herein incorporated by reference in its entirety.

The waveguide display 230 is configured to emit the image light that includes a virtual object. The image light (e.g., a virtual object) is emitted by the waveguide display 230. The waveguide display 230 includes a source and a waveguide. The source comprises a plurality of emitters, wherein each emitter may be, e.g., a superluminous LED, a laser diode, a vertical cavity surface emitting laser (VCSEL), a light emitting diode (LED), an organic LED (OLED), a microLED, a tunable laser, or some other light source. The plurality of emitters may be in an array (e.g., a 2 D array), and in some embodiments may form a complete image frame. In other embodiments, the image light from the source is scanned (e.g., using a scanning mirror) into the waveguide to form an image. The image light passes through the focusing assembly 210, and is focused at an image plane according to the optical power of the focusing assembly 210. The waveguide display 230 assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display 230 may be polychromatic and include a single waveguide. In yet other embodiments, the waveguide display 230 is polychromatic and includes a stacked array of monochromatic waveguides that are each associated with a different band of light, i.e., are each sources of different colors. A varifocal waveguide display is a display that can adjust a focal position of image light emitted from the waveguide display 230. In some embodiments, a waveguide display assembly may include a combination of one or more monochromatic waveguide displays 230 (i.e., a monochromatic waveguide display or a stacked, polychromatic waveguide display) and a varifocal waveguide display. Waveguide displays are described in detail in U.S. patent application Ser. No. 15/495,373, incorporated herein by references in its entirety.

The controller 240 is configured to select an optical power of a plurality of optical power of the focusing assembly 210 and the compensating assembly 220 and generate the multifocal instructions corresponding to the selected optical power of the focusing assembly 210 and the compensating assembly 220. The controller 240 receives orientation data of the NED (e.g., NED 100) from the orientation detection device (e.g., orientation detection device 120). The orientation data may contain angular velocity and linear acceleration in up to six degrees of freedom, describing the NED's orientation in 3-axes. Based in part on the orientation data of the NED, the controller 240 determines an orientation vector of the NED and compares it to a gravity vector. The gravity vector is used as a benchmark for the orientation vector, and an angular difference between the two vectors may be used to select the optical power for both the compensating assembly 220 and the focusing assembly 210. For example, the angular difference may be compared to a threshold value. If the angular difference is less than the threshold value (e.g., less than 30 degrees), the controller 240 selects a first optical power of the focusing assembly 210 and a corresponding first optical power of the compensating assembly 220. If the angular difference is at least the threshold value (e.g., at least 30 degrees) the controller 240 selects a second optical power of the focusing assembly 210 and a corresponding second optical power of the compensating assembly 220. In some embodiments, the controller 240 generates multifocal instructions based in part on the angular difference, and provides the multifocal instructions to the focusing assembly 210 and to the compensating assembly 220 to adjust the optical powers.

In some embodiments, the NED includes an eye tracker (e.g., eye tracker 170), and the controller 240 generates multifocal instructions based in part on the captured images of the eye position. In a first example, the user may be looking at a picture drawn at eye level on a window from a close distance such that the angular difference is at least the threshold value. In a second example, the user may be looking at an object across the street through the window such that the angular difference is also at least the threshold value. The controller may select optical powers of the focusing assembly 210 and the compensating assembly 220 for the first example and select different optical powers of the focusing assembly 210 and the compensating assembly 220 for the second example. The selected optical powers of the focusing assembly 210 and the compensating assembly 220 are different in the first example and the second example because the appropriate location of the image plane for the augmented scene is different for the two examples. In the first example, the user is looking at a picture drawn at eye level on a window from a close distance, and the optical powers of the focusing assembly 210 and the compensating assembly 220 are selected such that the image plane for the augmented scene is at a close distance from the user. In the second example, the user is looking at an object across the street through the window so a different optical power of the focusing assembly 210 and the compensating assembly 220 are selected such that the image plane for the augmented scene is at a distance farther from the user. The eye tracker may be used in combination with the orientation detection device to generate the multifocal instructions based in part on the determined gaze area and the depth information as well as the angular difference.

In some embodiments, the controller 240 collects data from the orientation detection device 120, the depth camera assembly 125, the eye tracker 170, or a combination thereof, and selects the optical power of the focusing assembly 210 and the compensating assembly 220 based on the collected data.

Figure 3:
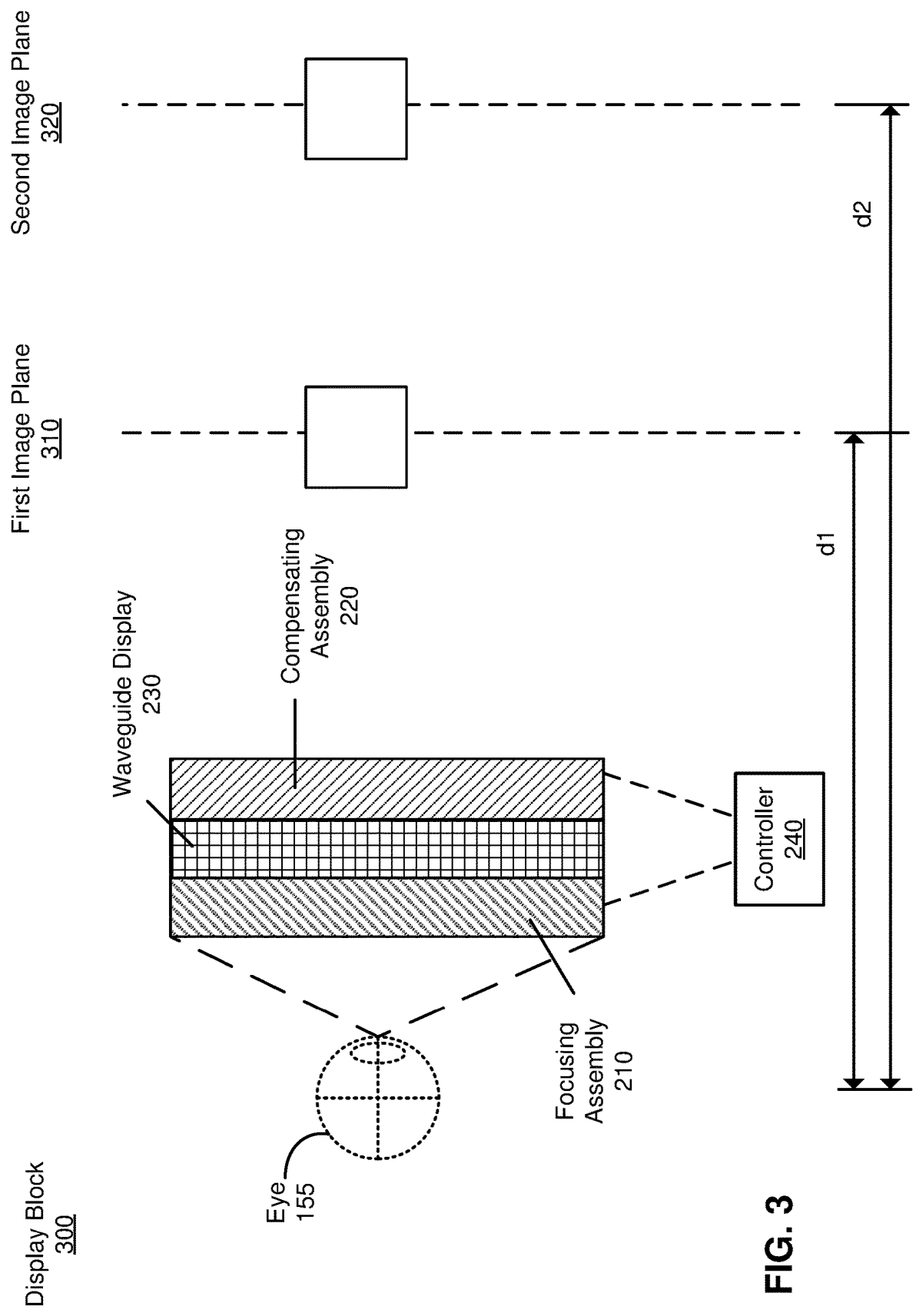
FIG. 3 is a cross-section of the display block in FIG. 2, in accordance with one or more embodiments.

FIG. 3 is a cross-section of a display block 300, in accordance with one or more embodiments. The display block 300 is an embodiment of the display block 200. The display block 300 includes the waveguide display 230, which is attached to the focusing assembly 210 on the side closer to the user's eye and attached to the compensating assembly 220 on a side farther away from the user's eye 155. In some embodiments, an orientation detection device (e.g., orientation detection device 120) collects orientation data of a NED (e.g., the NED 100). The collected data is transmitted to the controller 240 and used by the controller 240 to determine an orientation vector of the NED and compare it to a gravity vector. The angular difference between the two vectors is used in part to select the optical power of the compensating assembly 220 and the focusing assembly 210. In one embodiment, a user performs an act (e.g., reading a book, looking at own shoes) such that the user's head is tilted downwards. The angular difference between the orientation vector and the gravity vector is determined to be less than a threshold value. In some embodiments, the threshold value is 30 degrees. In other embodiments, the threshold value may be a different value greater or less than 30 degrees. Since the determined angle between the orientation vector and the gravity vector is less than the threshold value, the controller selects a first optical power and generates the corresponding multifocal instructions for the focusing assembly 210 and compensating assembly 220. The series of optical elements in the focusing assembly 210 and compensating assembly 220 are adjusted such that the optical powers of the two assemblies counteract the effects of each other when light passes through the display block 300 and enters the user's eye 155 (i.e., real-life image).

The image light (i.e., computer generated image) is displayed in the waveguide display 230. The image light passes through the focusing assembly 210, which is adjusted to have a first optical power, and is focused at the first image plane 310. The first image plane 310 is at a distance of d1 away. In some embodiments d1 is no more than 0.5 meters from the NED. The image light and the light from the local area are combined, resulting in an augmented scene with the computer generated image superimposing the real-life image.

In one embodiment, the NED includes an orientation detection device (e.g., orientation detection device 120) and an eye tracker (e.g., eye tracker 170). The controller 240 collects data from the orientation detection device and the eye tracker and selects the optical power of the focusing assembly 210 and the compensating assembly 220 based on the collected data.

In one example a user stands at the top of a building and looks over a ledge into a street below. The user's head is tilted downward and the orientation detection device (e.g., the orientation detection device 120) collects orientation data of the NED. The eye tracker (e.g., the eye tracker 170) determines the position of the user's eye 155 and collects information about an angle of eye-gaze and the gaze area. The controller 240 receives the orientation data from the orientation detection device and determines that the angular difference between the orientation vector and the gravity vector is less than the threshold value. The controller also receives data from the eye tracker and determines that the user's eye 155 is focused at a distance far away and generates multifocal instruction corresponding to the second optical power. The image light is displayed at a second image plane 320 at a distance of d2 from the NED, which is farther from the NED from the first image plane 310.

In another example, the user looks at an object far away and the user's head is parallel to the ground. Based on the orientation data from the orientation detection device, the controller 240 determines that the angular difference between the orientation vector and the gravity vector is at least the threshold value. The controller 240 also receives data from the eye tracker and determines that the user's eye 155 is focused at a distance far away (i.e., distance greater than d2) and generates multifocal instruction corresponding to the second optical power. When the image light is displayed at the waveguide display 230 and passes through the focusing assembly 210, the image light lies on the second image plane 320 at a distance of d2 away from the user's eye 155.

In an alternate example, the user looks at an object at eye level from a close distance (e.g., distance less than d2), and the user's head is parallel to the ground. Based on the orientation data from the orientation detection device 120, the controller 240 determines that the angular difference between the orientation vector and the gravity vector is at least the threshold value. The controller 240 also receives data from the eye tracker and determines that the user's eye is focused on an object at a close distance. The controller generates multifocal instructions corresponding to the first optical power. When the image light is displayed at the waveguide display 230 and passes through the focusing assembly 210, the image light lies on the first image plane 310 at a distance of d1 away from the user's eye 155.

Figure 4:
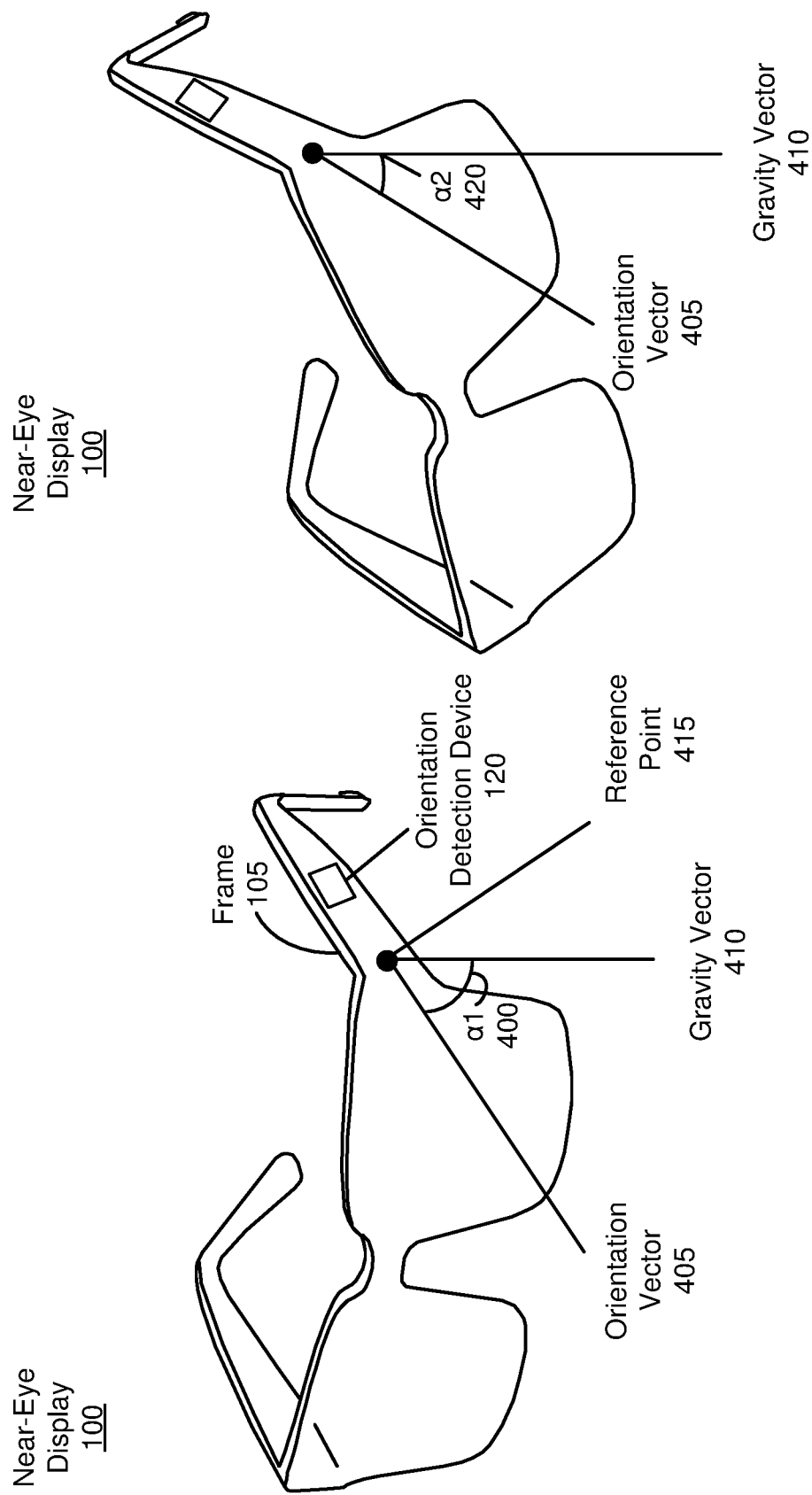
FIG. 4A is an example of a first orientation of a NED, in accordance with one or more embodiments.
FIG. 4B is an example of a second orientation of a NED, in accordance with one or more embodiments.

FIG. 4A is an example of a first orientation of a NED (e.g., the NED 100), in accordance with one or more embodiments. An orientation detection device 120 attached with a frame 105 collects orientation data of a near eye display 100. The orientation detection device 120 transmits the orientation data to the controller 240, and the controller 240 determines an orientation vector 405 of the NED 100 relative to a reference point 415. The reference point 415 may be located anywhere on the frame 105. The controller 240 compares the orientation vector 405 to a gravity vector 410 and determines a first angle α1 400 between the two vectors. The first angle α1 400 is at least a threshold value of 30 degrees and the controller 240 generates multifocal instructions for the focusing assembly 210 and the compensating assembly 220. In one example, a user performs an act (e.g., look across the street) that places the NED in the first orientation, such that the first angle α1 400 is at least the threshold value.

FIG. 4B is an example of a second orientation of a NED (e.g., the NED 100), in accordance with one or more embodiments. The controller 240 determines that angle between the orientation vector 405 and the gravity vector 410 is a second angle α2 420. The second angle α2 420 is smaller than the threshold value of 30 degrees, and the controller 240 generates multifocal instructions for the focusing assembly 210 and the compensating assembly 220. In one example, a user performs an act (e.g., look down at own shoes, read a book) that places the NED in the second orientation such that the user's head is tilted downwards and the second angle α2 420 is less than the threshold value.

In a first embodiment, the NED includes the orientation detection device 120 but does not have an eye tracker (e.g., eye tracker 170). In a second embodiment, the NED includes both the orientation detection device 120 and an eye tracker (e.g., eye tracker 170). The NED in the first embodiment has an advantage over the NED in the second embodiment because it is simpler in design and can respond faster to movement because it does not have to process eye tracking information as well as orientation data.

Figure 5:
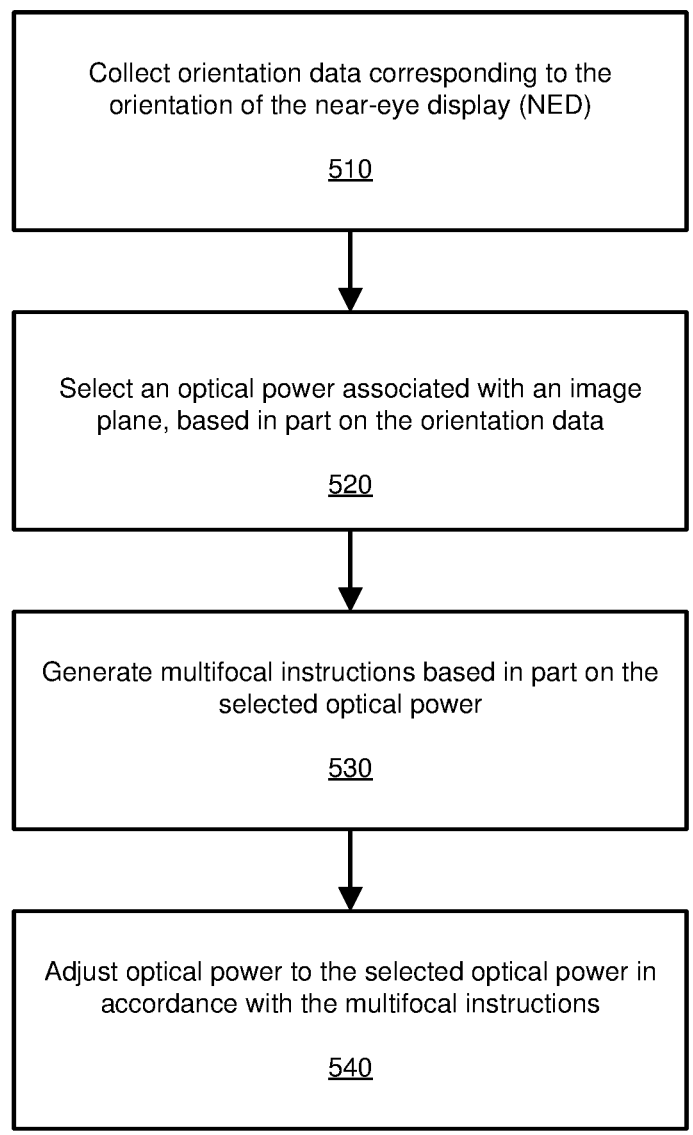
FIG. 5 is a flow chart illustrating a process of presenting an augmented scene, in accordance with one or more embodiments.

FIG. 5 is a flow chart illustrating a process 500 of presenting an augmented scene, in accordance with one or more embodiments. The process 500 of FIG. 5 may be performed by a NED (e.g., the NED 100). Other entities (e.g., a console) may perform some of the steps of the process in other embodiments. Likewise, embodiments may include different and/or additional steps, or perform the steps in different orders.

The NED collects 510 orientation data corresponding to the orientation of the near-eye display (NED). The NED may include an orientation detection device (e.g., orientation detection device 120). The orientation detection collects information used to determine an orientation of the NED.

The NED selects 520 an optical power associated with an image plane, based in part on the orientation data. In some embodiments, the NED selects, based in part on the orientation data, an optical power from a plurality of optical powers of a focusing assembly (e.g., the focusing assembly 210). And the plurality of optical powers are each associated with a different image plane. The orientation data collected by the orientation detection device may be used to determine an orientation vector of the NED. The angular difference between the orientation vector and a gravity vector is compared to a threshold value. A first optical power is selected when the angular difference is less than the threshold value, and a second optical power is selected when the angular difference is at least the threshold value. In some embodiments, the NED may further base its selection of optical power based in part on information from an eye tracker. Using the selected optical power, the NED may also select an optical power of a compensating assembly (e.g., the compensating assembly 220). For example, if the selected optical power is 2 diopters, the NED selects an optical power of −2 diopters for the compensating assembly.

The NED generates 530 multifocal instructions based in part on the selected optical power. The NED may include an eye tracker (e.g., eye tracker 170) that determines gaze area of a user and a depth camera assembly (e.g., depth camera assembly 125) that determines the depth information for a local area in a field of view of the NED. The NED may be configured to generate multifocal instructions based on the gaze area and depth information as well as the orientation data.

The NED adjusts 540 an optical power to the selected optical power in accordance with the multifocal instructions. The multifocal instructions adjust the optical power of the focusing assembly the selected optical powers such that the image light (i.e., computer generated image) appears at the corresponding image plane. The multifocal instructions may also adjust an optical power of the compensating assembly to the selected optical power for it, such that distortion of light from the local area that would otherwise be caused by the focusing assembly is mitigated.

Figure 6:
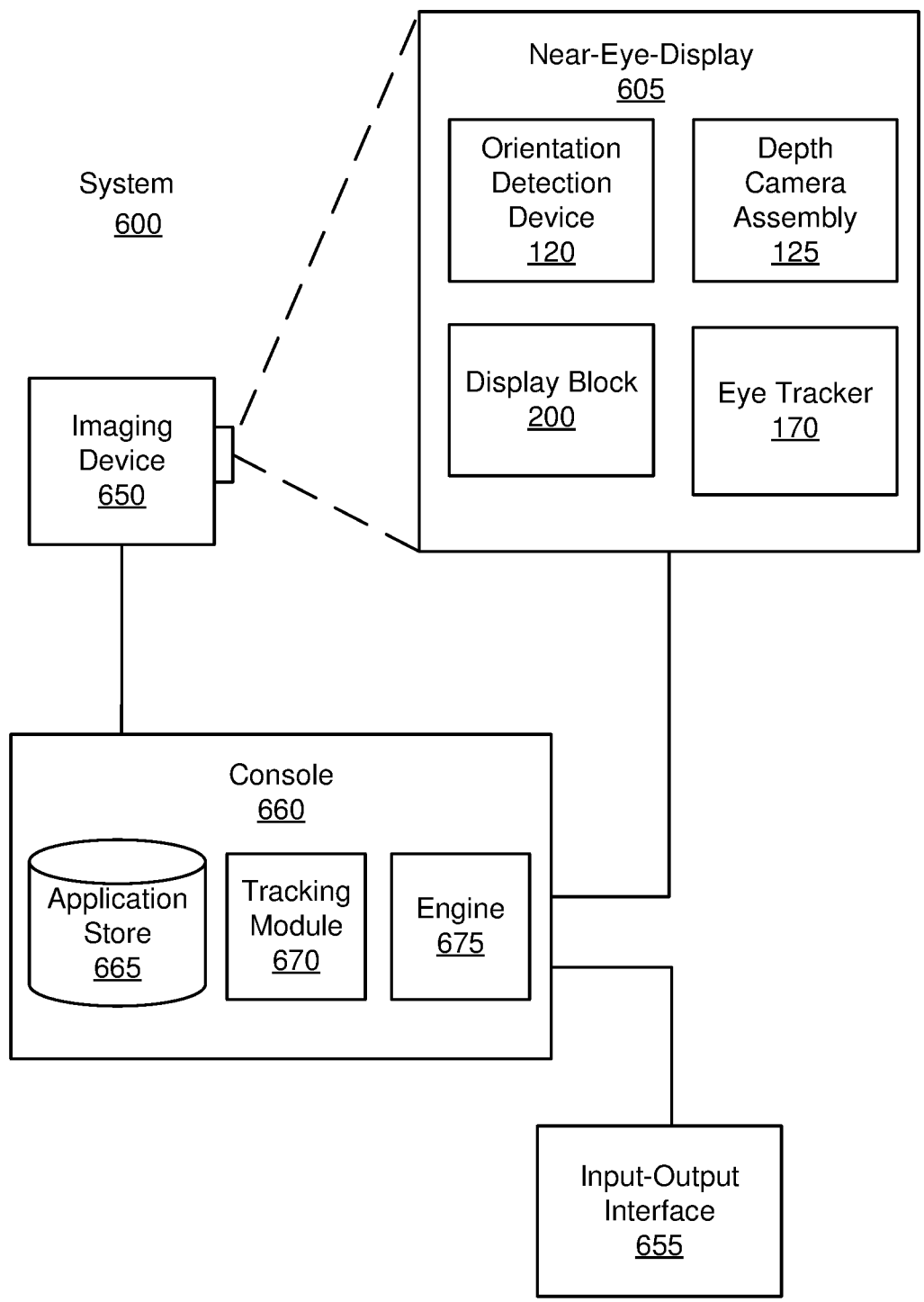
FIG. 6 is a block diagram of NED system, in accordance with one or more embodiments.

FIG. 6 is a block diagram of a NED system 600, in accordance with one or more embodiments. The NED system 600 shown by FIG. 6 comprises a NED 605, and an input-output (I/O) interface 655 that are each coupled to a console 660. Additionally, in some embodiments, the NED system 600 may also include an imaging device 650 that is coupled to the console 660. While FIG. 6 shows an example NED system 600 including one NED 605, one imaging device 650, and one I/O interface 655, in other embodiments any number of these components may be included in the system 600. For example, there may be multiple NEDs 605 each having an associated I/O interface 655 and being monitored by one or more imaging devices 650, with each NED 605, I/O interface 655, and imaging devices 650 communicating with the console 660. In alternative configurations, different and/or additional components may be included in the system 600. Similarly, functionality of one or more of the components can be distributed among the components in a different manner than is described here. For example, some or all of the functionality of the console 660 may be contained within the NED 605. The NED system 600 may operate in an artificial reality environment.

The NED 605 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the NED 605, the console 660, or both, and presents audio data based on the audio information. An embodiment of the NED 605 may be the NED 100 described above in conjunction with FIG. 1A.

The NED 605 includes an orientation detection device 120, a DCA 125, a display block 200, and an eye tracker 170. Some embodiments of the NED 605 have different components than those described here. Additionally, the functionality provided by various components described in conjunction with FIG. 6 may be differently distributed among the components of the NED 605 in other embodiments.

The orientation detection device 120 is configured to collect data that correspond to the motion of the NED 605. The NED includes a controller (e.g., controller 240) that determines an orientation vector of the NED 605 based in part on the data. The controller compares the orientation vector to a gravity vector and computes an angular difference.

The DCA 125 includes a light generator, an imaging device and a controller. The light generator of the DCA 125 is configured to illuminate the local area with illumination light in accordance with emission instructions. The imaging device of the DCA 125 includes a lens assembly, a filtering element and a detector. The lens assembly is configured to receive light from a local area surrounding the imaging device and to direct at least a portion of the received light to the detector. The controller of the DCA 125 generates the emission instructions and provides the emission instructions to the light generator. The controller of the DCA 125 further determines depth information for the one or more objects based in part on the captured one or more images.

The display block 200 comprises a focusing assembly (e.g., focusing assembly 210), a compensating assembly (e.g., compensating assembly 220), a waveguide display (e.g., waveguide display 230), and a controller (e.g., controller 240). The controller receives data from the orientation detection device 120. In some embodiments, the controller may also receive data from the eye tracker 170 and/or the depth camera assembly 125. The controller generates multifocal instructions based in part on the received data. The multifocal instructions control the optical powers of the focusing assembly and the compensating assembly. Some embodiments of the NED 605 have different components than those described here. Similarly, the functions can be distributed among other components in the NED system 600 in a different manner than is described here. The display block 200 combines light from a local area with image light to form an augmented scene. More details about the display block are discussed in conjunction with FIG. 2.

In some embodiments, the eye tracker 170 is integrated into the NED 605. The eye tracker 170 determines eye tracking information associated with an eye of a user wearing the NED 605. The eye tracking information determined by the eye tracker 170 may comprise information about an orientation of the user's eye (i.e., information about an angle of an eye-gaze). An embodiment of the eye tracker 170 may comprise an illumination source and an imaging device (camera).

The imaging device 650 generates image tracking data in accordance with calibration parameters received from the console 660. The imaging device 650 may include one or more cameras, one or more video cameras, any other device capable of capturing images, or some combination thereof. Additionally, the imaging device 650 may include one or more hardware and software filters (e.g., used to increase signal to noise ratio). Image tracking data is communicated from the imaging device 650 to the console 660, and the imaging device 650 receives one or more calibration parameters from the console 660 to adjust one or more imaging parameters (e.g., focal length, focus, frame rate, ISO, sensor temperature, shutter speed, aperture, etc.). The image tracking data may be used by the console 660 to determine an orientation of the NED 605. Note that in alternate embodiments (not shown) the NED system 600 does not include the imaging device 650.

The I/O interface 655 is a device that allows a user to send action requests to the console 660. An action request is a request to perform a particular action. For example, an action request may be to start or end an application or to perform a particular action within the application. The I/O interface 655 may include one or more input devices. Example input devices include: a keyboard, a mouse, a game controller, or any other suitable device for receiving action requests and communicating the received action requests to the console 660. An action request received by the I/O interface 655 is communicated to the console 660, which performs an action corresponding to the action request. In some embodiments, the I/O interface 655 may provide haptic feedback to the user in accordance with instructions received from the console 660. For example, haptic feedback is provided if an action request is received, or the console 660 communicates instructions to the I/O interface 655 causing the I/O interface 655 to generate haptic feedback if the console 660 performs an action.

The console 660 provides content to the NED 605 for presentation to the user in accordance with information received from one or more of: the imaging device 650, the NED 605, and the I/O interface 655. In the example shown in FIG. 6, the console 660 includes an application store 665, a tracking module 670, and an engine 675. Some embodiments of the console 660 have different modules than those described herein. Similarly, the functions further described below may be distributed among components of the console 660 in a different manner than is described herein.

The application store 665 stores one or more applications for execution by the console 660. An application is a group of instructions, that when executed by a processor, generates content for presentation to the user. Content generated by an application may be in response to inputs received from the user via movement of the NED 605 or the I/O interface 655. Examples of applications include: gaming applications, conferencing applications, video playback application, or other suitable applications.

The tracking module 670 tracks movements of the NED 605 and determines positions of the NED 605. The tracking module 670 may use information from the imaging device 650, the DCA 125, the orientation detection device 120, or some combination thereof, to determine a position of the NED 605. The tracking module 670 calibrates the system 600 using one or more calibration parameters and may adjust one or more calibration parameters to reduce error in determination of the position of the NED 605. For example, the tracking module 670 adjusts the focus of the imaging device 650 to obtain a more accurate position of the NED 605. Additionally, if tracking of the NED 605 is lost, the tracking module 670 re-calibrates some or all of the system 600. The tracking module 670 tracks movements of the NED 605 using image tracking information from the imaging device 650 and determines positions of a reference point of the NED 605

The engine 675 executes applications within the system environment 600 and receives position information, acceleration information, velocity information, predicted future positions, or some combination thereof of the NED 605 from the tracking module 670. Based on the received information, the engine 675 determines content to provide to the NED 605 for presentation to the user. For example, if the received information indicates that the user has looked to the left, the engine 675 generates content for the NED 605 that mirrors the user's movement in a virtual environment. Additionally, the engine 675 performs an action within an application executing on the console 660 in response to an action request received from the I/O interface 655 and provides feedback to the user that the action was performed. The provided feedback may be visual or audible feedback via the NED 605 or haptic feedback via the I/O interface 655.

The engine 675 may be configured to utilize eye tracking information determined by the eye tracker 170, the orientation detection device 120, and depth camera assembly 125, or some combination thereof, for a variety of display and interaction applications. In some embodiments, the engine 675 may perform some or all functions of the display block (e.g., selecting an optical power for the focusing assembly and compensating assembly). In some embodiments, based on information about position and orientation of the user's eye received from the eye tracker 170, the orientation detection device 120, and depth camera assembly 125, or some combination thereof, the engine 675 determines resolution of the content provided to the NED 605 for presentation to the user on the display block 200. The engine 675 provides the content to the NED 605 having a maximum pixel density (maximum resolution) on the NED 605 in a foveal region of the user's gaze, whereas the engine 536 provides a lower pixel resolution in other regions of the display block 200, thus achieving less power consumption at the NED 605 and saving computing cycles of the console 660 without compromising a visual experience of the user. In some embodiments, the engine 675 can be configured to optimize the performance of viewing optics of the NED 605 (e.g., components of the display block 200), based on the information obtained from the eye tracker 170, the orientation detection device 120, and depth camera assembly 125, or some combination thereof. In one embodiment, the engine 675 can adjust optical distortion correction parameters of the viewing optics, e.g., to prevent vergence-accommodation conflict. In an alternate embodiment, the engine 675 can adjust focus of images displayed on the display block 200, e.g., to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye display (NED) comprising:
   an orientation detection device configured to provide orientation data describing an orientation of the NED;
   a display block configured to combine light from a local area with image light to form an augmented scene, and provide the augmented scene to an eyebox corresponding a location of a user's eye, the display block comprising:
   a display assembly configured to emit the image light, the image light including a virtual object;
   a focusing assembly configured to adjust its optical power in accordance with multifocal instructions; and
   a controller configured to:
   select an optical power, of a plurality of optical powers of the focusing assembly, based in part on the orientation data, the selected optical power associated with an image plane, and
   generate the multifocal instructions based in part on the selected optical power, and
   wherein the augmented scene includes the virtual object at the image plane.

2. The NED of claim 1, wherein the display block further comprises:
   a compensating assembly having a plurality of compensating optical powers that correspond to a respective optical power of the plurality of optical powers of the focusing assembly, wherein the compensating assembly selects a compensating optical power in accordance with the multifocal instructions.

3. The NED of claim 1, wherein the orientation detection device is configured to collect data that corresponds to the orientation of the NED.

4. The NED of claim 1, wherein the controller is configured to:
   determine an orientation vector of the NED based in part on the orientation detection device data;
   determine an angle between the orientation vector and a gravity vector; and
   generate the multifocal instructions based in part on the determined angle.

5. The NED of claim 4, wherein if the determined angle is less than a threshold value, the multifocal instructions cause the focusing assembly to select a first optical power that is associated with a first image plane, and if the determine angle is at least the threshold value, the multifocal instructions cause the focusing assembly to select a second optical power that is associated with a second image plane, wherein the second image plane is located farther from the NED than the first image plane.

6. The NED of claim 4, further comprising:
   an eye tracking system configured to determine a gaze area of a user;
   a depth camera assembly configured to determine depth information for a local area in a field of view of the NED, and
   wherein the controller is further configured to generate the multifocal instructions based in part on the determined gaze area and the depth information.

7. The NED of claim 1, wherein the focusing assembly includes a geometric phase lens that has at least two optical powers, and a particular optical power associated with the geometric phase lens is determined by the multifocal instructions.

8. The NED of claim 1, wherein the focusing assembly includes a liquid membrane lens that has at least two optical powers, and a particular optical power associated with the liquid membrane lens is determined by the multifocal instructions.

9. A near-eye display (NED) comprising:
   a display block configured to combine light from a local area with image light to form an augmented scene, and provide the augmented scene to an eyebox corresponding a location of a user's eye, the display block comprising:
- a display assembly configured to emit the image light;
- a focusing assembly having a plurality of optical powers that each correspond to different image planes, wherein the focusing assembly selects an optical power of the plurality of optical powers in accordance with multifocal instructions; and
- a controller configured to generate the multifocal instructions based in part on an orientation vector of the NED.

10. The NED of claim 9, wherein the display block further comprises:
- a compensating assembly having a plurality of compensating optical powers that correspond to a respective optical power of the plurality of optical powers of the focusing assembly, wherein the compensating assembly selects a compensating optical power in accordance with the multifocal instructions.

11. The NED of claim 9, further comprising a position sensor that is configured to generate information describing an orientation of the NED, wherein the position sensor is selected from a group consisting of: an accelerometer, a gyroscope, and a magnetometer.

12. The NED of claim 9, wherein the controller is configured to:
- determine an angle between the orientation vector and a gravity vector; and
- generate the multifocal instructions based in part on the determined angle.

13. The NED of claim 12, wherein if the determined angle is less than a threshold value, the multifocal instructions cause the focusing assembly to select a first optical power that is associated with a first image plane, and if the determine angle is at least the threshold value, the multifocal instructions cause the focusing assembly to select a second optical power that is associated with a second image plane, wherein the second image plane is located farther from the NED than the first image plane.

14. The NED of claim 13, wherein the first focal plane is located no more than 0.5 meters from the NED.

15. The NED of claim 13, wherein the threshold angle is 30 degrees.

16. The NED of claim 12, further comprising:
- an eye tracking system configured to determine a gaze area of a user;
- a depth camera assembly configured to determine depth information for a local area in a field of view of the NED, and
- wherein the controller is further configured to generate the multifocal instructions based in part on the determined gaze area and the depth information.

17. The NED of claim 9, wherein the focusing assembly includes a geometric phase lens that has at least two optical powers, and a particular optical power associated with the geometric phase lens is determined by the multifocal instructions.

18. The NED of claim 9, wherein the focusing assembly includes a liquid membrane lens that has at least two optical powers, and a particular optical power associated with the liquid membrane lens is determined by the multifocal instructions.

19. A method comprising:
- collecting orientation data describing an orientation of the NED;
- selecting, based in part on the orientation data, an optical power from a plurality of optical powers of a focusing assembly, wherein the plurality of optical powers are each associated with a different image plane; and
- adjusting an optical power of the focusing assembly to the selected optical power.

20. The method of claim 19, wherein selecting, based in part on the orientation data, the optical power from the plurality of optical powers of the focusing assembly further comprises:
- determining an orientation vector of the NED based in part on the orientation data;
- determining an angle between the orientation vector and a gravity vector;
- comparing the angle to a threshold value; and
- selecting the optical power based in part on the comparison.

* * * * *